United States Patent
Schwenk et al.

(10) Patent No.: US 7,999,237 B2
(45) Date of Patent: Aug. 16, 2011

(54) VALUABLE DOCUMENT

(75) Inventors: Gerhard Schwenk, Puchheim (DE);
Gregor Grauvogl, Oberhaching (DE);
Ulrich Magg, Feldgeding (DE); Ulrich Scholz, Buchbach (DE)

(73) Assignee: Giesecke & Devrient GmbH, Munich (DE)

( * ) Notice: Subject to any disclaimer, the term of this patent is extended or adjusted under 35 U.S.C. 154(b) by 995 days.

(21) Appl. No.: 11/632,424

(22) PCT Filed: Jul. 6, 2005

(86) PCT No.: PCT/EP2005/007311
§ 371 (c)(1),
(2), (4) Date: Sep. 11, 2007

(87) PCT Pub. No.: WO2006/005498
PCT Pub. Date: Jan. 19, 2006

(65) Prior Publication Data
US 2010/0163747 A1   Jul. 1, 2010

(30) Foreign Application Priority Data
Jul. 14, 2004   (DE) .......................... 10 2004 034 189

(51) Int. Cl.
*F21V 9/16* (2006.01)
*G21H 3/02* (2006.01)

(52) U.S. Cl. .................................. 250/458.1; 250/361 R
(58) Field of Classification Search ............... 250/458.1, 250/361 R
See application file for complete search history.

(56) References Cited

U.S. PATENT DOCUMENTS

| | | | | |
|---|---|---|---|---|
| 3,671,454 A | * | 6/1972 | Inoue et al. | 252/301.4 F |
| 4,225,653 A | * | 9/1980 | Brixner | 428/690 |
| 4,452,843 A | | 6/1984 | Kaule et al. | |
| 6,123,871 A | * | 9/2000 | Carroll | 252/301.36 |
| 6,383,618 B1 | | 5/2002 | Kaule et al. | |
| 6,506,476 B1 | | 1/2003 | Kaule et al. | |
| 6,599,444 B2 | * | 7/2003 | Burnell-Jones | 252/301.36 |
| 6,740,262 B2 | * | 5/2004 | Oshio | 252/584 |
| 2001/0006228 A1 | * | 7/2001 | Justel et al. | 252/301.4 P |
| 2002/0130304 A1 | | 9/2002 | Paeschke et al. | |
| 2003/0025084 A1 | * | 2/2003 | Honda et al. | 250/370.11 |
| 2003/0129516 A1 | * | 7/2003 | Nakamura et al. | 430/108.21 |
| 2003/0194578 A1 | * | 10/2003 | Tam et al. | 428/690 |
| 2005/0168125 A1 | * | 8/2005 | Srivastava et al. | 313/486 |

FOREIGN PATENT DOCUMENTS

| | | |
|---|---|---|
| DE | 10056462 | 5/2002 |
| EP | 0 052 624 | 6/1982 |
| EP | 1 241 242 | 9/2002 |
| WO | WO 03/104533 | 12/2003 |

* cited by examiner

*Primary Examiner* — David P Porta
*Assistant Examiner* — Jessica L Eley
(74) *Attorney, Agent, or Firm* — Bacon & Thomas, PLLC

(57) ABSTRACT

The invention relates to a printed value document having at least one luminescent substance.

46 Claims, 1 Drawing Sheet

VALUABLE DOCUMENT

Figure 1:
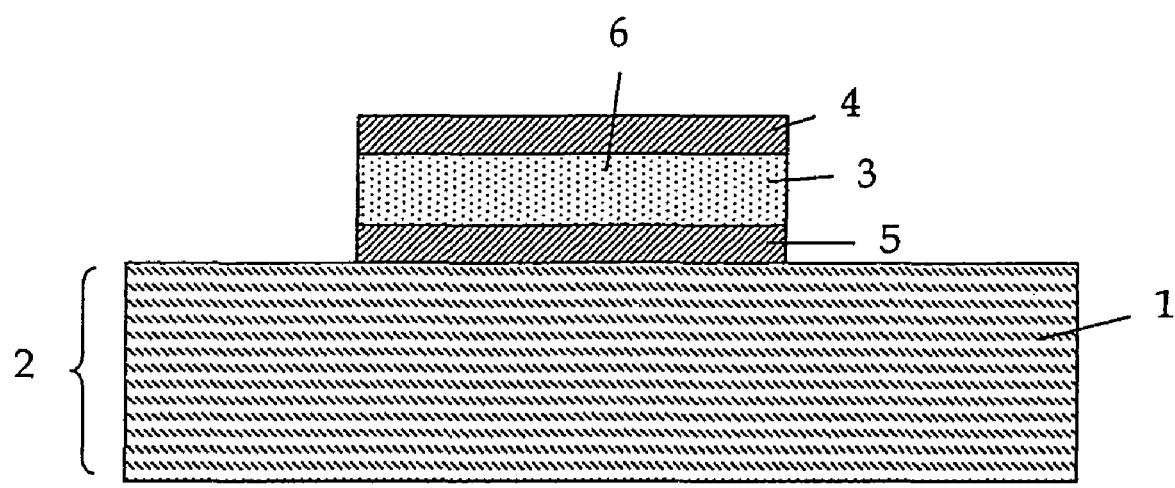

This invention relates to a luminescent substance, a value document, a security element and a security paper having at least one luminescent substance as an authenticity feature. The invention also relates to different methods for checking the authenticity of such value document, security element or security paper, and to methods for production thereof.

Security paper will hereinafter be understood to be paper that is e.g. already equipped with security elements, such as a watermark, security thread, hologram patch, etc., but is not yet fit for circulation and is an intermediate product in production of the value document. Value document will refer to the product fit for circulation.

The designation "value document" will refer in the context of the invention to bank notes, checks, shares, tokens, identity cards, credit cards, passports and other documents as well as labels, seals, packages or other elements for product protection.

The protection of value documents against forgery by means of luminescent substances has been known for some time. EP 0 052 624 B2 uses for example luminescent substances based on host lattices doped with rare earth metals.

Preferably, substances are used in which either the absorption or the emission is outside the visible spectral range.

If the emissions are at wavelengths between approx. 400 nm and approx. 700 nm, the luminescent substances are detectable with the eye upon suitable excitation. For some applications this is desired, e.g. in authenticity testing by illumination with UV light. For other applications, however, it is of advantage if the emission is outside the visible spectral range, since special detectors are then necessary for detecting the substances.

However, luminescent substances with characteristic properties that are suitable for protecting value documents and in particular for automatic authenticity recognition are restricted in number. Most inorganic and organic luminescent substances have uncharacteristic, wide spectra, insufficient emission intensity and are moreover often commercially available. This impedes their identification and makes it impracticable to use several of said substances simultaneously.

Starting out from this prior art, the invention is based on the problem of increasing the number of luminescent substances suitable as authenticity features for value documents and providing in particular value documents and security papers having authenticity features in the form of luminescent substances that differ from value documents and security papers having hitherto known luminescent substances by a characteristically altered excitation and/or emission spectrum.

The solution to this problem can be found in the independent claims. Developments are the subject matter of the subclaims.

According to the invention, at least one luminescent substance is used for protection. Preferably, its emission spectrum is in the visible or infrared spectral range (VIS, IR). Particularly preferably, the luminescent substance emits in the near infrared (NIR). The excitation is preferably also effected in the near infrared.

Depending on the inventive luminescent substance used, the emission band can follow the Stokes or anti-Stokes rule or quasi-resonance can be observed.

The substances suitable for the inventive authenticity protection are luminescent substances with the general formula $$XZO_4$$

where

X stands for $Sc_a Y_b La_c Ce_d Pr_e Nd_f Sm_g Eu_h Gd_i Tb_k Dy_l HO_m Er_n Tm_o Yb_p Lu_q Sb(III)_r Bi_s Cr_t Mn(III)_u F(III)_v [Ba_w Mn(II)_x Fe(II)_y Ca_z Sn(II)_\alpha Sr_\beta Co_\gamma Ni_\delta Cu_\epsilon]_{3/2} [Na_\eta K_\lambda]_3 [U(IV)_\mu Pb_\pi Th_\sigma]_{3/4} U(VI)_{\phi/2}$ and Z stands for $Nb_{za} Ta_{zb} V_{zc} P_{zd} [Ti_{ze} Zr_{zf} Sn(IV)_{zg}]_{5/4} W_{zh5/6} Fe(III)_{zi5/3}$ and $a+b+c+d+e+f+g+h+i+k+l+m+n+o+p+q+r+s+t+u+v+3/2(w+x+y+z+\alpha+\beta+\gamma+\delta+\epsilon)+3(\eta+\lambda)+3/4(\mu+\pi+\sigma)+\phi/2=1$, and a, b, c, d, e, f, g, h, i, k, l, m, n, o, p, q, r, s, t, u, v, w, x, y, z, $\alpha$, $\beta$, $\gamma$, $\delta$, $\epsilon$, $\eta$, $\lambda$, $\mu$, $\pi$, $\sigma$ and $\phi$ each range from 0 to 1, and $za+zb+zc+zd+5/4(ze+zf+zg)+5/6zh+5/3zi=1$, and za, zb, zc, zd, ze, zf, zg, zh and zi each range from 0 to 1.

The symbols listed for X and Z correspond to the symbols in the periodic system of the elements, O stands for oxygen.

The X elements Sc, Y, La, Ce, Pr, Nd, Sm, Eu, Gd, Tb, Dy, Ho, Er, Tm, Yb, Lu, Sb, Bi, and Cr have the oxidation state 3 here.

The X elements Ba, Ca, Sn, Sr, Co, Ni and Cu have the oxidation state 2 here.

The X elements Na and K have the oxidation state 1 here.

The X elements Mn and Fe have the oxidation state 2 and/or 3 here.

The X elements Pb and Th have the oxidation state 4 here.

The X element U has the oxidation states 4 and/or 6 here.

The Z elements Nb, Ta, V and P have the oxidation state 5 here.

The Z elements Ti, Zr and Sn have the oxidation state 4 here.

The Z element W has the oxidation state 6 here.

The Z element Fe has the oxidation state 3 here.

It is of course possible to replace individual X and/or Z elements by further elements, such as indium (In), aluminum (Al), magnesium (Mg) and chromium (Cr), as long as the stoichiometric ratios are taken into account and the crystal lattice allows. In particular, dopings with chromium and aluminum or with magnesium and aluminum are preferred.

In a preferred embodiment, the X element present is at least La or Y or both, i.e. it holds that b≠0 and/or c≠0 in the general formula. All other X elements or only selected ones thereof can of course also be present additionally. In particular, k≠0 and/or o≠0 holds here.

In a further preferred embodiment, X stands for $Y_b La_c$ and $b+c=1$ and $0<b<1$ and $0<c<1$. In this case, only the two elements La and Y are present in the luminescent substance as X elements.

It is further preferred that X stands for La or for Y, i.e. that only one X element is present in the general formula.

In another preferred embodiment,

X stands for $Y_b La_c Pr_e Nd_f Dy_l HO_m Er_n Yb_p Cr_t Mn(III)_u Fe(III)_v [Mn(II)_x Fe(II)_y Co_\gamma Ni_\delta Cu_\epsilon]_{3/2}$ and it holds that $b+c+e+f+l+m+n+p+t+u+v+3/2(x+y+\gamma+\delta+\epsilon)=1$, and b, c, e, f, l, m, n, p, t, u, v, x, y, $\gamma$, $\delta$, $\epsilon$ each range from 0 to 1.

Further it is preferred if the inventive luminescent substance contains at least one, at least two or at least three rare earth elements as X elements, i.e. that c≠0 and/or d≠0 and/or e≠0 and/or f≠0 and/or g≠0 and/or h≠0 and/or i≠0 and/or k≠0 and/or l≠0 and/or m≠0 and/or n≠0 and/or o≠0 and/or p≠0 and/or q≠0.

In particular, the rare earth elements are selected from the group of Ho, Er, Yb and Nd, i.e. f≠0 and/or m≠0 and/or n≠0 and/or p≠0. Particularly preferably, Y is also present in the presence of Ho, Er, Yb and/or Nd.

If at least two rare earth elements are present, these are particularly preferably the combinations Er and Yb with $n \neq 0$ and $p \neq 0$, Nd and Yb with $f \neq 0$ and $p \neq 0$ or Er and Nd with $n \neq 0$ and $f \neq 0$.

If Ho, Er or Yb is present according to the general formula, i.e. if $m \neq 0$ or $n \neq 0$ or $p \neq 0$, then Pr, Dy, Nd, Cr, Mn, Fe, Co, Ni and/or Cu are preferably also present, so that it holds that $e \neq 0$ and/or $l \neq 0$ and/or $f \neq 0$ and/or $t \neq 0$ and/or $u \neq 0$ and/or $v \neq 0$ and/or $x \neq 0$ and/or $y \neq 0$ and/or $\gamma \neq 0$ and/or $\delta \neq 0$ and/or $\epsilon \neq 0$.

If Nd is present according to the general formula, i.e. if $f \neq 0$, then Pr, Dy, Cr, Mn, Fe, Co, Ni and/or Cu are preferably also present, so that it holds that $e \neq 0$ and/or $l \neq 0$ and/or $t \neq 0$ and/or $u \neq 0$ and/or $v \neq 0$ and/or $x \neq 0$ and/or $y \neq 0$ and/or $\gamma \neq 0$ and/or $\delta \neq 0$ and/or $\epsilon \neq 0$.

In a further preferred embodiment, X stands for $Y_b La_c Pr_e Nd_f Er_n Yb_p Fe(III)_v$, and $b+c+e+f+n+p+v=1$, and b, c, e, f, n, p and v each range from 0 to 1.

Further preferably, X stands for $Y_b Yb_p Pr_e$, $b+e+p=1$, b, e and p each range from 0 to 1, it preferably holding that $0<b<1$ and $0<e<1$ and $0<p<1$.

Further preferably, X stands for $Y_b Nd_f Fe(III)_v$, $b+f+v=1$, b, f and v each range from 0 to 1, it preferably holding that $0<b<1$ and $0<f<1$ and $0<v<1$.

Further preferably, X stands for $Y_b Er_n$, $b+n=1$, b and n each range from 0 to 1, it preferably holding that $0<b<1$ and $0<n<1$.

Further preferably, X stands for $Y_b Nd_f Er_n$, $b+f+n=1$, b, f and n each range from 0 to 1, it preferably holding that $0<b<1$ and $0<f<1$ and $0<n<1$.

Further preferably, X stands for $Y_b Yb_p Nd_f$, $b+p+f=1$, b, p and f each range from 0 to 1, it preferably holding that $0<b<1$, $0<p<1$ and $0<f<1$.

Further preferably, X stands for $Y_b Nd_f$, $b+f=1$, b and f each range from 0 to 1, it preferably holding that $0<b<1$ and $0<f<1$.

Further preferably, X stands for $Y_b Yb_p$, $b+p=1$, b and p each range from 0 to 1, it preferably holding that $0<b<1$ and $0<p<1$.

Further preferably, X stands for Y.

In a further preferred embodiment, the Z element present is at least Ta, Nb, P, Ti or W. At least all five elements can also be present. Thus it holds that $za \neq 0$ and/or $zb \neq 0$ and/or $zd \neq 0$ and/or $ze \neq 0$ and/or $zh \neq 0$.

Further preferably, the Z elements present are only elements selected from the group of Ta, Nb and P. Thus Z stands for $Nb_{za} Ta_{zb} P_{zd}$, $za+zb+zd=1$, and za, zb and zd each range from 0 to 1, it preferably holding that $0<za<1$, $0<zb<1$ and $0<zd<1$. In particular, Z stands for Nb, i.e. niobates are present, or Z stands for Ta, i.e. tantalates are present.

Further preferably, Z stands for $Nb_{za} Ta_{zb}$, $za+zb=1$, and za and zb each range from 0 to 1, it preferably holding that $0<za<1$ and $0<zb<1$. In this embodiment, niobate-tantalate mixtures are present.

Compounds with the following formulae are also preferred:

$Y_b La_c Nb_{za} Ta_{zb} O_4$, where $b+c=1$, $za+zb=1$, and b, c, za and zb each range from 0 to 1.

$Y_b Yb_p NbO_4$, where b and p range from 0 to 1, $b+p=1$. Particularly preferably it holds that $p>0.5$.

$Y_b Yb_p Nd_f NbO_4$, where b, p and f each range from 0 to 1, and $b+p+f=1$.

Particularly preferred compounds are $YNbO_4$;
$Y_b Nd_f NbO_4$ with $b+f=1$ and $0<b<1$ and $0<f<1$;
$Y_b Yb_p NbO_4$ with $b+p=1$ and $0<b<1$ and $0<p<1$;
$Y_b Yb_p Nd_f NbO_4$ with $b+p+f=1$ and $0<b<1$ and $0<p<1$ and $0<f<1$;

$Y_b Yb_p Nd_f NbO_4$: (Mg, Al) with $0<b<1$ and $0<p<1$ and $0<f<1$, an additional doping with magnesium and aluminum being present;

$Y_b Nd_f NbO_4$: (Cr, Al) with $0<b<1$ and $0<f<1$, an additional doping with chromium and aluminum being present;

$Y_b Yb_p Pr_e NbO_4$ with $b+e+p=1$ and $0<b<1$ and $0<e<1$ and $0<p<1$;

$Y_b Nd_f Fe_v NbO_4$ with $b+f+v=1$ and $0<b<1$ and $0<f<1$ and $0<v<1$;

$Y_b Er_n NbO_4$ with $b+n=1$ and $0<b<1$ and $0<n<1$;

$Y_b Nd_f Er_f NbO_4$ with $b+f+n=1$ and $0<b<1$ and $0<f<1$ and $0<n<0$

It preferably holds for all compounds in which Y and Yb are present that the proportion of Yb is greater than the proportion of Y.

The positions and forms (intensity, width, etc.) of the excitation and/or emission bands are dependent on the quantity ratios of the elements involved, the type of elements and the type and quantity of the dopants.

For protection of value documents it is possible to use both broadband and narrowband luminescence, but for reasons of selectivity the narrowband luminescence is preferred.

One normally speaks of narrowband emission when the bands occurring in the emission spectrum show an average half-value width of less than 50 nm. However, this does not mean that bands having a half-value width outside this range do not also solve the inventive problem.

Variation and combination of the inventive luminescent substances open up numerous possibilities for influencing the excitation and emission spectra of the inventive luminescent substances and thus producing a multiplicity of security features. Besides the evaluation of the excitation and/or emission spectra, the lifetime of luminescence or decay time can likewise be used for distinction. Evaluation can take account of not only the wavelengths of the excitation or emission lines but also their number and/or form and/or intensities, so that any desired coding can be represented.

Likewise it is possible to obtain an energy transfer between like and/or unlike elements in certain inventive luminescent substances, i.e. produce a quasi-resonance, and to use it for identification.

If the value document is marked, not with one, but with several, of the inventive luminescent substances, the number of distinguishable combinations can be increased further. If different mixing ratios are moreover distinguished from each other, the number of combinations can be increased again. Marking can be done either at different places on the value document or at the same place. If the luminescent sub-stance is applied or incorporated at different places on the value document, it is possible to produce a spatial code, in the simplest case e.g. a bar code.

Further, the falsification security of the value document can be increased if the special selected luminescent substance e.g. in a value document is linked with other information of the value document, permitting a check by means of a suitable algorithm. The value document can of course have further additional authenticity features, such as classic fluorescence and/or magnetism, besides the inventive luminescent substance.

The luminescent substances can be incorporated into the value document in a great variety of ways according to the invention. For example, the luminescent substances can be incorporated into a printing ink. It is also possible to admix the luminescent substance to the paper pulp or plastic mass during production of a value document based on paper or plastic. The luminescent substances can likewise be provided on or in a plastic supporting material, which for example can in turn be at least partly embedded in the paper pulp. The supporting material, which is based on a suitable polymer, such as PMMA, and in which the inventive luminescent substance is embedded, can have the form of a security thread, a mottling fiber or a planchet. Likewise, for product protection the luminescent substance can be e.g. incorporated directly into the material of the object to be protected, e.g. in housings and plastic bottles.

However, the plastic or paper supporting material can also be fastened to any other desired object e.g. for product protection. In this case the supporting material preferably has the form of a label. If the supporting material is part of the product to be protected, as is the case e.g. with tear threads, any other design is of course also possible. In certain application cases it can be expedient to provide the luminescent substance as an invisible coating on the value document. It can be present here all over or also in the form of certain patterns, such as stripes, lines, circles, or also in the form of alphanumeric characters. To ensure the invisibility of the luminescent substance, it is possible according to the invention to use either a colorless luminescent substance in the printing ink or coating lacquer, or a colored luminescent substance in such a low concentration that the transparency of the coating is just given. Alternatively or in addition, the supporting material can also already be suitably colored, so that colored luminescent substances are not perceived due to their inherent color.

The inventive luminescent substances are normally processed in the form of pigments. For better processing or to increase their stability, the pigments can in particular be present as individually encapsulated pigment particles or be covered with an inorganic or organic coating. For example, the individual pigment particles are surrounded by a silicate cover and can thus be more easily dispersed in media. Likewise, different pigment particles of a combination can be encapsulated jointly, e.g. in fibers, threads, silicate covers. It is thus e.g. no longer possible to change the "code" of the combination subsequently. "Encapsulation" refers here to complete encasing of the pigment particles, while "coating" also refers to partial encasing or coating of the pigment particles.

The inventive luminescent substances are characterized in particular by their high intensity in the emission spectrum and the simple production. Furthermore, the inventive luminescent substances have the advantage that the location of the emission bands is already influenced by simple variation in the elementary composition, thereby providing a multiplicity of distinguishable feature substances.

In the following, some examples of the inventive luminescent substance will be explained in more detail.

For preparation, the initial substances in oxidic form or substances that can be converted to oxides are mixed in a suitable ratio, then annealed, crushed, washed (e.g. with water), dried and ground.

EXAMPLE 1

$Y_{0.1}Yb_{0.9}TaO_4$ 539.46 g of $Ta_2O_5$, 27.57 g of $Y_2O_3$, 432.97 g of $Yb_2O_3$ and 500.00 g of $Na_2SO_4$ (ultrapure, anhydrous) as a fluxing agent are intimately intermixed in a paddle mixer. The mix is poured into a crucible and annealed at 1150° C. for 6 to 24 hours. The material cooled for 1 to 2 days after the oven is switched off is liberated from the sulfate by washing, and ground with a common pin mill to fineness that permits homogeneous and invisible incorporation into paper or printing inks.

The thus produced compound has the totals formula $Y_{0.1}Yb_{0.9}TaO_4$.

EXAMPLE 2

$Y_{2.4}Yb_{0.3}Nd_{0.3}CaAlNb_2O_{12}$

| Component | Quantity | Substance | Purity |
|---|---|---|---|
| 1 | 359.660 g | $Y_2O_3$ | 5 N |
| 2 | 78.46 g | $Yb_2O_3$ | 4 N |
| 3 | 66.988 g | $Nd_2O_3$ | 4 N |
| 4 | 74.431 g | CaO | reagent-grade |
| 5 | 67.662 g | $Al_2O_3$ | 4 N |
| 6 | 352.80 g | $Nb_2O_5$ | 4 N |
| 7 | 1000.00 g | $Na_2SO_4$ | (ultrapure) |

Components 1 to 7 are mixed intimately at high turbulence. The mix is poured into crucibles (sintered ceramics based on $Al_2O_3$) and annealed at 1150° C. between 6 to 24 hours. The material cooled over 1 to 2 days after the oven is switched off is washed free of sulfate (detection limit<1 mg/ltr) and finely ground with a suitable mill. Homogeneous incorporation into the paper, plastic or a suitable printing ink is favored depending on the degree of fineness of grinding.

The thus produced compound has the totals formula $Y_{2.4}Yb_{0.3}Nd_{0.3}CaAlNb_2O_{12}$.

EXAMPLE 3

$Y_{0.65}Yb_{0.18}Er_{0.17}NbO_4$

| Component | Quantity | Substance | Purity |
|---|---|---|---|
| 1 | 267.58 g | $Y_2O_3$ | 5 N |
| 2 | 129.31 g | $Yb_2O_3$ | 4 N |
| 3 | 118.543 g | $Er_2O_3$ | 3 N |
| 4 | 484.57 g | $Nb_2O_5$ | 4 N |
| 5 | 1000.00 g | $Na_2SO_4$ | (ultrapure) |

Components 1 to 5 are mixed intimately at high turbulence. The mix is poured into crucibles (sintered ceramics based on $Al_2O_3$) and annealed at 1150° C. between 6 to 24 hours. The material cooled over 1 to 2 days after the oven is switched off is washed free of sulfate (detection limit<1 mg/ltr) and finely ground with a suitable mill. Homogeneous incorporation into the paper, plastic or a suitable printing ink is favored depending on the degree of fineness of grinding.

The thus produced compound has the totals formula $Y_{0.65}Yb_{0.18}Er_{0.17}NbO_4$.

EXAMPLE 4

$Y_{0.4}Yb_{0.5}Nd_{0.1}NbO_4$

| Component | Quantity | Substance | purity |
|---|---|---|---|
| 1 | 153.92 g | $Y_2O_3$ | 5 N |
| 2 | 335.77 g | $Yb_2O_3$ | 4 N |
| 3 | 57.338 g | $Nd_2O_3$ | 3 N |

| Component | Quantity | Substance | purity |
|---|---|---|---|
| 4 | 452.970 g | $Nb_2O_5$ | 4 N |
| 5 | 1000.00 g | $Na_2SO_4$ | (ultrapure) |

Components 1 to 5 are mixed intimately at high turbulence. The mix is poured into crucibles (sintered ceramics based on $Al_2O_3$) and annealed at 1150° C. between 6 to 24 hours. The material cooled over 1 to 2 days after the oven is switched off is washed free of sulfate (detection limit<1 mg/ltr) and finely ground with a suitable mill. Homogeneous incorporation into the paper, plastic or a suitable printing ink is favored depending on the degree of fineness of grinding.

The thus produced compound has the totals formula $Y_{0.4}Yb_{0.5}Nd_{0.1}NbO_4$.

EXAMPLE 5

$Y_{0.009}Yb_{0.9}Pr_{0.001}NbO_4$

| Component | Quantity | Substance | Purity |
|---|---|---|---|
| 1 | 34.76 g | $Y_2O_3$ | 5 N |
| 2 | 551.44 g | $Yb_2O_3$ | 4 N |
| 3 | 0.51 g | $Pr_6O_{11}$ | 4 N |
| 4 | 413.29 g | $Nb_2O_5$ | 4 N |
| 5 | 1000.00 g | $Na_2SO_4$ | (ultrapure) |

Components 1 to 5 are mixed intimately at high turbulence. The mix is poured into crucibles (sintered ceramics based on $Al_2O_3$) and annealed at 1150° C. between 6 to 24 hours. The material cooled over 1 to 2 days after the oven is switched off is washed free of sulfate (detection limit<1 mg/ltr) and finely ground with a suitable mill. Homogeneous incorporation into the paper, plastic or a suitable printing ink is favored depending on the degree of fineness of grinding.

The thus produced compound has the totals formula $Y_{0.099}Yb_{0.9}Pr_{0.001}NbO_4$.

EXAMPLE 6

$Y_{0.967}Eu_{0.033}NbO_4$

| Component | Quantity | Substance | Purity |
|---|---|---|---|
| 1 | 440.44 g | $Y_2O_3$ | 5 N |
| 2 | 23.42 g | $Eu_2O_3$ | 4 N |
| 3 | 536.14 g | $Nb_2O_5$ | 4 N |
| 4 | 1000.00 g | $Na_2SO_4$ | (ultrapure) |

Components 1 to 4 are mixed intimately at high turbulence. The mix is poured into crucibles (sintered ceramics based on $Al_2O_3$) and annealed at 1150° C. between 6 to 24 hours. The material cooled over 1 to 2 days after the oven is switched off is washed free of sulfate (detection limit<1 mg/ltr) and finely ground with a suitable mill. Homogeneous incorporation into the paper, plastic or a suitable printing ink is favored depending on the degree of fineness of grinding.

The thus produced compound has the totals formula $Y_{0.967}Eu_{0.033}NbO_4$.

EXAMPLE 7

$Y_{2.8}Er_{0.2}Nb_{0.60}Fe_4O_{12}$

| Component | Quantity | Substance | Purity |
|---|---|---|---|
| 1 | 419.55 g | $Y_2O_3$ | 5 N |
| 2 | 50.76 g | $Er_2O_3$ | 4 N |
| 3 | 105.83 g | $Nb_2O_5$ | 4 N |
| 4 | 423.86 g | $Fe_2O_3$ | Carbonyl iron |
| 5 | 500.00 g | $Na_2SO_4$ | (ultrapure) |

Components 1 to 5 are mixed intimately at high turbulence. The mix is poured into crucibles (sintered ceramics based on $Al_2O_3$) and annealed at 1150° C. between 6 to 24 hours. The material cooled over 1 to 2 days after the oven is switched off is washed free of sulfate (detection limit<1 mg/ltr) and finely ground with a suitable mill. Homogeneous incorporation into the paper, plastic or a suitable printing ink is favored depending on the degree of fineness of grinding.

The thus produced compound has the totals formula $Y_{2.8}Er_{0.2}Nb_{0.60}Fe_4O_{12}$.

Further embodiments and advantages of the invention will be explained in the following with reference to the FIGURE. The proportions shown in the FIGURE do not necessarily correspond to the relations existing in reality and serve mainly to improve clarity.

FIG. 1 shows an inventive value document in cross section.

FIG. 1 shows an embodiment of the inventive security element. The security element consists in this case of a label 2 composed of a paper or plastic layer 3, a transparent cover layer 4 and an adhesive layer 5. Said label 2 is connected via the adhesive layer 5 to any desired substrate 1. Said substrate 1 can be a value document, identity card, passport, certificate or the like, but also another object to be protected, such as a CD, package or the like. The luminescent substance 6 is contained within the volume of the layer 3 in this embodiment.

Alternatively, the luminescent substance could also be contained in a printing ink (not shown) which is printed on one of the label layers, preferably on the surface of the layer 3.

Instead of providing the luminescent substance in or on a supporting material which is then fastened to an object as a security element, it is also possible according to the invention to provide the luminescent substance directly in the value document to be protected or on the surface thereof in the form of a coating.

The invention claimed is:
1. A luminescent substance with the general formula

$XZO_4$

X stands for $Sc_a$ $Y_b$ $La_c$ $Ce_d$ $Pr_e$ $Nd_f$ $Sm_g$ $Eu_h$ $Gd_i$ $Tb_k$ $Dy_l$ $Ho_m$ $Er_n$ $Tm_o$ $Yb_p$ $Lu_q$ $Sb(III)_r$ $Bi_s$ $Cr_t$ $Mn(III)_u$ $Fe(III)_v$ $[Ba_w$ $Fe(II)_y$ $Ca_z$ $Sn(II)_\alpha$ $Sr_\beta$ $Co_\gamma$ $Ni_\delta$ $Cu_\epsilon]_{3/2}$ $[Na_\eta$ $K_\lambda]_3$ $[U(IV)_\mu$ $Pb_\pi$ $Th_o]_{3/4}$ $U(VI)_{\phi/2}$ and Z stands for $Nb_{za}$ $Ta_{zb}$ $V_{zc}$ $P_{zd}$ $[Ti_{ze}$ $Zr_{zf}Sn(IV)_{zg}]_{5/4}$ $W_{zhs/6}$ $Fe(III)_{zts/3}$ and $a+b+c+d+e+f+g+h+i+k+l+m+n+o+p+q+r+s+t+u+v+3/2(w+x+y+z+\alpha+\beta+\gamma+\delta+\epsilon)+3(\eta+\lambda)+3/4(\mu+\pi+\sigma)+\phi/2=1$, and a, b, c, d, e, f, g, h, k, l, m, n, o, p, q, r, s, t, u, v, w, x, y, z, $\alpha$, $\beta$, $\gamma$, $\delta$, $\epsilon$, $\eta$, $\lambda$, $\mu$, $\pi$, $\sigma$ and $\phi$ each range from 0 to 1, and $za+zb+zc+zd+5/4(ze+zf+zg)+5/6zh+5/3zi=1$, and za, zb, zc, zd, ze, zf, zg, zh and zi each range from 0 to 1, and further wherein $m \neq 0$ and/or $n \neq 0$ and/or $f \neq 0$.

2. A luminescent substance according to claim 1, wherein $b \neq 0$ and/or $c \neq 0$ and/or $k \neq 0$ and/or $o \neq 0$.

3. A luminescent substance according to claim 1, wherein $b+c=1$ and $0<b<1$ and $0<c<1$.

4. A luminescent substance according to claim 1, wherein $c=1$ or $b=1$.

5. A luminescent substance according to claim 1, wherein X stands for $Y_b La_c Pr_e Nd_f Dy_l Ho_m Er_n Yb_p Cr_t Mn(III)_u Fe(III)_v [Mn(II)_x Fe(II)_y Co_\gamma Ni_\delta Cu_\epsilon]_{3/2}$, and $b+c+e+f+l+m+n+p+t+u+v+3/2(x+y+\gamma+\delta+\epsilon)=1$, and b, c, e, f, l, m, n, p, t, u, v, x, y, $\gamma$, $\delta$, $\epsilon$ each range from 0 to 1 and wherein at least one of f, m, n, and p is $>0$.

6. A luminescent substance according to claim 1, wherein $c \neq 0$ and/or $d \neq 0$ and/or $e \neq 0$ and/or $g \neq 0$ and/or $h \neq 0$ and/or $i \neq 0$ and/or $k \neq 0$ and/or $l \neq 0$ and/or $o \neq 0$ and/or $q \neq 0$.

7. A luminescent substance according to claim 1, wherein ($n \neq 0$ and $p \neq 0$) or ($f \neq 0$ and $p \neq 0$) or ($n \neq 0$ and $f \neq 0$).

8. A luminescent substance according to claim 1, wherein if $m \neq 0$ or $n \neq 0$ or $p \neq 0$, then it holds that $e \neq 0$ and/or $l \neq 0$ and/or $f \neq 0$ and/or $t \neq 0$ and/or $u \neq 0$ and/or $v \neq 0$ and/or $x \neq 0$ and/or $y \neq 0$ and/or $\gamma \neq 0$ and/or $\delta \neq 0$ and/or $\epsilon \neq 0$.

9. A luminescent substance according to claim 1, wherein if $f \neq 0$, then it holds that $e \neq 0$ and/or $l \neq 0$ and/or $t \neq 0$ and/or $u \neq 0$ and/or $v \neq 0$ and/or $x \neq 0$ and/or $y \neq 0$ and/or $\gamma \neq 0$ and/or $\delta \neq 0$ and/or $\epsilon \neq 0$.

10. A luminescent substance according to claim 1, wherein X stands for $Y_b La_c Pr_e Nd_f Er_n Yb_p Fe(III)_v$, and $b+c+e+f+n+p+v=1$, and b, c, e, f, n, p and v each range from 0 to 1, and wherein at least one of f, n, and p>0.

11. A luminescent substance according to claim 1, wherein X stands for $Y_b Yb_p Pr_e$, $b+e+p=1$, and wherein b and e range from 0 to 1 and $0<p<1$.

12. A luminescent substance according to claim 1, wherein X stands for $Y_b Nd_f Fe(III)_v$, $b+v+f=1$, and wherein b and v range from 0 to 1 and $0<f<1$.

13. A luminescent substance according to claim 1, wherein X stands for $Y_b Er_n$, $b+n=1$, and wherein b ranges from 0 to 1 and $0<n<1$.

14. A luminescent substance according to claim 1, wherein X stands for $Y_b Nd_f Er_n$, $b+f+n=1$, and wherein b, f and n each range from 0 to 1, wherein at least one of f and n is 0.

15. A luminescent substance according to claim 1, wherein X stands for $Y_b Yb_p Nd_f$, $b+p+f=1$, and wherein b, p and f each range from 0 to 1, wherein at least one of f and p is $>0$.

16. A luminescent substance according to claim 1, wherein X stands for $Y_b Nd_f$, $b+f=1$, and b ranges from 0 to 1 and $0<f<1$.

17. A luminescent substance according to claim 1, wherein X stands for $Y_b Yb_p$, $b+p=1$, and b ranges from 0 to 1 and $0<p<1$.

18. A luminescent substance according to claim 1, wherein the luminescent substance is additionally doped with Al and/or Mg and/or Cr.

19. A luminescent substance according to claim 1, wherein the luminescent substance is additionally doped with (Al and Mg) or (aluminum and Cr).

20. A luminescent substance according to claim 1, wherein $za \neq 0$ and/or $zb \neq 0$ and/or $ze \neq 0$ and/or $zh \neq 0$.

21. A luminescent substance according to claim 1, wherein Z stands for $Nb_{za} Ta_{zb} P_{zd}$, $za+zb+zd=1$, and $0<za<1$, $0<zb<1$ and $0<zd<1$.

22. A luminescent substance according to claim 1, wherein Z stands for $Nb_{za} Ta_{zb}$, $za+zb=1$, and $0<za<1$ and $0<zb<1$.

23. A luminescent substance according to claim 1, wherein Z stands for Nb with za=1 or Ta with zb=1 or P with zd=1.

24. A security element comprising a luminescent substance according to claim 1.

25. A security element according to claim 24, wherein the security element has the form of a strip or band.

26. A security element according to claim 24, wherein the security element is formed as a security thread, planchet or mottling fiber.

27. A security element according to claim 24, wherein the security element is formed as a label.

28. A security element according to claim 24, wherein the at least one luminescent substance is embedded into a supporting material of the security element or applied to the supporting material.

29. A test method for checking the authenticity of a security element according to claim 24, comprising evaluating the wavelengths and/or number and/or the form and/or the intensities of the emission lines and/or the excitation bands of the luminescent substances.

30. A test method for checking the authenticity of a security element according to claim 24, wherein the lifetimes of luminescence of the luminescent substances are evaluated.

31. A security paper comprising a luminescent substance according to claim 1.

32. A value document comprising a luminescent substance according to claim 1.

33. A value document according to claim 32, wherein the value document comprises paper or plastic.

34. A value document according to claim 32, wherein the luminescent substance is incorporated into the volume of the value document or present in a layer applied to the value document.

35. A value document according to claim 32, wherein the luminescent substance is provided as an invisible coating at least partly covering the surface of the value document.

36. A value document according to claim 32, wherein the luminescent substance is admixed to a printing ink.

37. A value document according to claim 32, wherein the coating has the form of one or more strips.

38. A value document according to claim 32 wherein the luminescent substance is present as pigment particles.

39. A method for producing a value document according to claim 32, wherein the luminescent substance is added to a printing ink.

40. A method for producing a value document according to claim 32, wherein the luminescent substance is applied by a coating process.

41. A method for producing a value document according to claim 32, wherein the luminescent substance is incorporated into the volume of the value document.

42. A method for producing a value document according to claim 32, wherein the luminescent substance is supplied to the value document by accordingly prepared mottling fibers.

43. A method for producing a value document according to claim 32, wherein the luminescent substance is supplied to the value document by an accordingly prepared security thread.

44. A test method for checking the authenticity of a value document according to claim 32, comprising evaluating the wavelengths and/or number and/or the form and/or the intensities of the emission lines and/or the excitation bands of the luminescent substances.

45. A test method for checking the authenticity of a value document or security element according to claim 44, wherein the emission lines and/or excitation bands represent a coding.

46. A test method for checking the authenticity of a value document according to claim 32, wherein the lifetimes of luminescence of the luminescent substances are evaluated.

* * * * *